United States Patent
Lesbats et al.

(10) Patent No.: US 11,458,869 B2
(45) Date of Patent: Oct. 4, 2022

(54) VEHICLE SEAT

(71) Applicant: FAURECIA Sièges d'Automobile, Nanterre (FR)

(72) Inventors: Fabrice Lesbats, Sucy en Brie (FR); David Epaud, Lardy (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/162,235

(22) Filed: Jan. 29, 2021

(65) Prior Publication Data
US 2021/0237627 A1 Aug. 5, 2021

(30) Foreign Application Priority Data
Jan. 31, 2020 (DE) .......................... 202020100544.8

(51) Int. Cl.
*B60N 2/30* (2006.01)
*B60N 2/02* (2006.01)

(52) U.S. Cl.
CPC .......... *B60N 2/3011* (2013.01); *B60N 2/0232* (2013.01); *B60N 2/3045* (2013.01); *B60N 2002/0236* (2013.01)

(58) Field of Classification Search
CPC .. B60N 2/3011; B60N 2/0232; B60N 2/3045; B60N 2/305; B60N 2/3079; B60N 2/3088
USPC ...................................................... 297/324
See application file for complete search history.

(56) References Cited

U.S. PATENT DOCUMENTS

| | | | |
|---|---|---|---|
| 6,079,763 A | 6/2000 | Clemente | |
| 7,066,543 B2 | 6/2006 | Yu | |
| 7,695,058 B2* | 4/2010 | Satta | B60N 2/0244 297/15 |
| 2005/0057082 A1* | 3/2005 | Hatta | B60N 2/309 297/341 |
| 2009/0189408 A1 | 7/2009 | Devoss | |
| 2010/0026073 A1 | 2/2010 | Bruck | |
| 2020/0101869 A1* | 4/2020 | Bouzid | B60N 2/0232 |

FOREIGN PATENT DOCUMENTS

FR 2930484 A1 10/2009

* cited by examiner

Primary Examiner — Mark R Wendell
(74) Attorney, Agent, or Firm — Barnes & Thornburg LLP

(57) ABSTRACT

A vehicle seat including a foldable seat kinematic which has a backrest part and a seat part, the seat kinematic being adjustable between a normal position and a folded-forward functional position, the seat kinematic being manually foldable from the normal position into the functional position, a motor, an activating system which is adapted to be driven by the motor between a deactivated position and an activated position, a connecting rod provided between the activating system and the seat kinematic. The seat kinematic is movable from the functional position into the normal position by the activating system and the connecting rod when the motor is actuated so as to drive the activating system from the deactivated position to the activated position, the activating system being configured to not interfere with the seat kinematic when the activating system is in the deactivated position.

13 Claims, 12 Drawing Sheets

VEHICLE SEAT

PRIORITY CLAIM

This application claims priority to German Patent Application No. DE202020100544.8, filed Jan. 31, 2020, which is expressly incorporated by reference herein.

BACKGROUND

The present disclosure relates to a vehicle seat which can be used particularly in a motor vehicle.

SUMMARY

According to the present disclosure, a vehicle seat may be adjusted with low effort between an upright normal position and a functional position and facilitates for the user a high degree of comfort in adjustment.

In illustrative embodiments, a vehicle seat includes
a foldable seat kinematic which has a backrest part and a seat part, said seat kinematic being adjustable between a normal position and a folded-forward functional position, said seat kinematic being manually foldable from the normal position into the folded-forward functional position;
a motor;
an activating system which is adapted to be driven by the motor between a deactivated position and an activated position; and
a connecting rod provided between the activating system and the seat kinematic.

In illustrative embodiments, the seat kinematic is movable from the folded-forward functional position into the normal position by the activating system and the connecting rod when the motor is actuated so as to drive the activating system from the deactivated position to the activated position, said activating system being configured to not interfere with the seat kinematic when said activating system is in the deactivated position.

Thus, a foldable seat kinematic is provided which can be manually adjusted by the user. In this regard, in particular a manual adjustment from the upright normal position into the folded functional position is provided; advantageously, also a manual return adjustment is basically possible. Furthermore, a motorised adjustment of the seat from the folded functional position back into the upright normal position is provided, for which an electric motor drives an activating system which adjusts the seat kinematic by way of a connecting rod.

Several advantages are already attained hereby. Thus, the user is able to fold the vehicle seat manually from the normal position into the functional position, which is generally possible more rapidly than with electric adjustments, advantageously also in the case of a switched-off electrical supply. By means of the electrical return adjustment from the folded functional position into the normal position, a higher degree of comfort is offered to the user, since this adjustment generally requires a higher degree of strength and it is less easy to reach e.g. engagement points for this manual return adjustment.

In this regard, advantageously no additional adjustment on the part of the user is provided in order to achieve the electrical return adjustment into the normal position from the functional position; thus, the user is able subsequently in turn to fold vehicle seat manually into the functional position.

When manually folding the seat into the functional position, the connecting rod can be adjusted with respect to the activating system without the activating system being compromised thereby. Advantageously, the connecting rod has a first or front end which is mounted on the seat kinematic and a second or rear end which is connected with the activating system. The rear end is particularly accommodated within limit stops and/or by way of an entrainment system in the activating system, e.g. in an elongated hole of a rocker of the activating system.

During the manual folding of the vehicle seat into the functional position, thus the second end of the connecting rod is adjusted with respect to the activating system, e.g. in the curved elongated hole of a rocker of the activating system. The curved elongated hole can define e.g. a stop limit or a stop position. During the motorised return adjustment, the motor drives the activating system, e.g. the rocker of the activating system, which adjusts back the connecting rod by way of the reception of the rear end of the connecting rod in the elongated hole, as a result of which the seat kinematic is righted and again assumes its normal position.

By means of this motorised adjustment, a return position is achieved in which the seat kinematic is admittedly already adjusted back into the normal position, but the activating system is not yet in its normal position. In order to achieve this, advantageously a subsequent adjustment of the activating system is undertaken by turning the motor in the opposite direction, as a result of which the activating system is adjusted into the normal position without in this regard adjusting the seat kinematic. In this regard, in particular the rocker can be pivoted in the opposite direction, such that the rear end of the connecting rod is guided in the curved elongated hole of the rocker and comes to rest against a limit stop.

At the end of this return adjustment, thus the activating system is again in its normal position or starting position, wherein in particular the second or rear end of the connecting rod can again reach the front limit stop or a front end of the elongated hole of the activating system.

Thus, a secure adjustment can be achieved with a low level of hardware expenditure and few components, and in particular also an easy control of the motor.

In this regard, an electric motor or also an E-pump can be provided in order to guarantee the adjustment of the activating system.

Advantageously, the seat kinematic has a foldable backrest part which in the functional position can form in particular a substantially horizontal rear side, and a seat part, wherein the seat part has in particular a seat structure part and a front foot part connected in an articulated manner with this, which front foot part is articulated on its lower end on a floor structure of the chassis. The kinematic of the seat part can particularly be configured such that when the backrest part is folded forward into the functional position the rear end of the seat structure part is pivoted downward and to the rear, and as a result the front foot part pivots at its upper end to the rear and downward, such that the seat part is folded flatly to the rear and as a result, advantageously, the connecting rod is pivoted via the front foot part to the rear.

In various embodiments, one ca use on or several of the following features, alone or in all possible mutual combinations:
the connecting rod has a first end and second end, said first end is connected with the seat kinematic and said second end is actuatable by the activating system;
said first end of the connecting rod is articulated on the seat kinematic;

the second end of the connecting rod is movable via manual folding of the seat kinematic between a first position corresponding to the normal position of the seat kinematic and a second position corresponding to the folded-forward functional position of the seat kinematic, and the second end of the connecting rod is movable by the activating system from the second position to the first position, by turning the motor in a first direction.

The motor is controlled by a control unit which, for moving the seat kinematic from the folded-forward functional position into the normal position, is adapted to:

in a first phase, have the motor turn in the first direction until the activating system is in the activated position and the seat kinematic is in the normal position; and in a second phase, have the motor turn in a second direction opposed to the first direction until the activating system is returned into the deactivated position.

the activating system has a rocker which is adapted to be pivoted bidirectionally by the motor, said rocker) being configured to move the connecting rod;

said rocker defines a first limit stop and second limit stop for the connecting rod, wherein the connecting rod is movable between the first limit stop and the second limit stop relative to the rocker;

the rocker has an elongated hole in which a portion unitary with the second end of the connecting rod is accommodated;

said rocker is configured to abut on a portion unitary with the second end of the connecting rod to move the connecting rod from the second position to the first position when the activating system is moved from the deactivated position to the activated position.

The vehicle seat further comprises a drive pinion which is adapted to be rotated by the motor and which is in engagement with a toothing region of the rocker;

a guiding connecting rod is articulated on a connecting pivot at the second end of the connecting rod;

the seat kinematic is foldable back manually into the normal position, without use of the activating system;

the seat kinematic is maintained in the normal position by a latch which is actuatable to release the seat kinematic and which is adapted to automatically latch the seat kinematic when said seat kinematic is returned from the folded-forward functional position to the normal position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
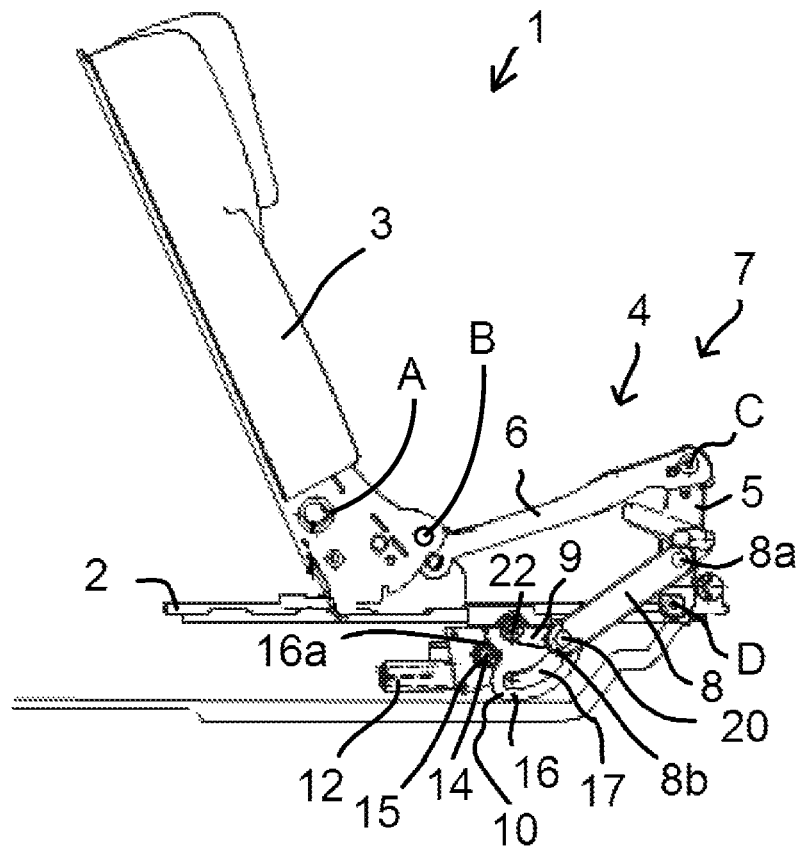
FIG. 1 shows a vehicle seat according to a first embodiment, in upright normal position (use position)

As shown in FIG. 1 for a first embodiment, a vehicle seat 1 is provided particularly for use in motor vehicles and has a structure part 2 on the chassis side, a backrest part 3 which can be pivoted with respect to the structure part 2 in a backrest axis A, and a seat part 4, wherein the backrest part 3 and the seat part 4 form a seat kinematic 7 which is provided such as to be adjustable on the structure part 2. The structure part 2 may be longitudinally adjustable with respect to a vehicle chassis or may also be securely attached to the vehicle chassis.

Furthermore, the vehicle seat 1 has a connecting rod 8, an activating system 10 and an electric motor 12 for adjusting the activating system 10.

In this embodiment, the seat part 4 is formed by a seat structure part 6 and a front foot part 5, wherein the seat structure part 6 defines a sitting surface of the seat part 4 and is articulated on the backrest part 3 with its rear, i.e. left in FIG. 1, end in a rear seat part axis B. The front foot part 5 is articulated in a central seat axis C on the seat structure part 6 and is articulated in a pivoting manner in a front lower pivot axis D on the structure part 2. The seat part 4 may include two front foot parts 5 provided on both sides of the seat part 4, for instance two connecting rods each articulated on axes C and D.

The activating system 10 has:

a rocker 16 having an outer toothing region 16a and a curved elongated hole 17;

as well as a guiding connecting rod 9.

The rocker 16 is pivotably mounted in a pivot 22 (rocker axis), e.g. on the structure part 2, wherein advantageously also the guiding connecting rod 9 is mounted in this pivot 22. The motor 12 turns a shaft 14 on which is provided a drive pinion 15 which is in engagement with the toothing region 16a of the rocker 16. Thus, the activating system 10 can be driven by the motor 12, wherein depending on the direction of rotation of the motor 12 the rocker 16 can be pivoted in both directions.

The connecting rod 8 is articulated with its first, front end 8a on the front foot part 5 and is articulated with its second, rear end 8b in a connecting pivot 20 (connecting axis) on the guiding connecting rod 9, wherein advantageously the connecting pivot 20 is accommodated in the curved elongated hole 17. In this manner, thus an entrainment mechanism is formed which permits an adjustment of the connecting pivot 20 and therewith of the connecting rod 8 in the elongated hole 8. Starting from FIG. 1, thus the connecting rod 8 can be adjusted to the rear and downward with its rear end 8b, i.e. the connecting pivot 20, in the elongated hole 8.

Figure 2:
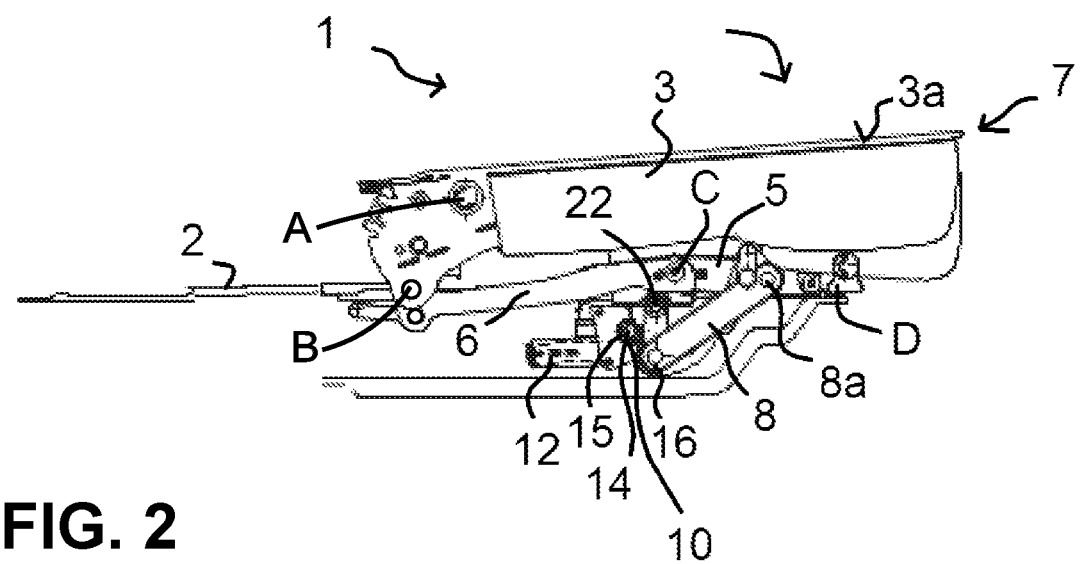
FIG. 2 shows the vehicle seat of FIG. 1 in manually forward-folded functional position.

Initially, the manual adjustment or folding-forward of the vehicle seat 1 from the normal position (use position) of FIG. 1 into the functional position of FIG. 2 is described:

Starting from the normal position of FIG. 1, after a manual unlocking of a latch of the seat kinematic 7, the vehicle seat 1 can be adjusted into the functional position of FIG. 2. Here, the backrest part 3 is manually folded forward, such that it forms with its rear side 3a a substantially horizontal functional surface e.g. according to FIG. 2. The rear, i.e. in FIG. 1 left, end of the seat structure part 6 is articulated in the front seat part axis B on the backrest part 3 and is adjusted to the rear and downward during this adjustment movement of the backrest 3. The front foot part 5 is upright in the normal position in FIG. 1 and, in this adjustment of the seat kinematic 7 from the normal position of FIG. 1 into the functional position of FIG. 2, is pivoted at the central seat axis C to the rear and downward, such that the entire seat part 4 is laid downward into a flat position under the folded-forward backrest part 3.

During this manual collapsing or manual folding from FIG. 1 to FIG. 2, the connecting rod 8 is also adjusted via the pivoting foot part 5, wherein it is adjusted to the rear and downward and its rear end 8b or the connecting pivot 20 slides in the elongated hole 17 of the rocker 16; the activating system 10 itself remains passive, i.e. it is not used or altered.

Subsequently, a manual folding back from FIG. 2 into FIG. 1 is also possible. However, in particular, a motorised return from the functional position of FIG. 2 is also possible, which is subsequently described with reference to FIGS. 3 and 4:

When turning the motor shaft 14 of the motor 12 in a first direction, the drive pinion 15 turns the rocker 16 in an activating direction which corresponds to the counterclockwise direction in the Figures. The rocker 16 thus entrains the connecting pivot 20 resting in the rear end of the elongated hole 17 and thereby the rear, second end 8b of the connecting rod 8, and adjusts the rear, second end 8b forward and upward. Since the connecting rod 8 is articulated with its front end 8a at the front foot part 5 between its axes C and D, the front foot part 5 is pivoted back forward and upward, i.e. back into its upright position, as a result of which the entire seat kinematic 7 and also the seat part 4 and the backrest part 3 are returned into the return position of FIG. 3.

Figure 3:
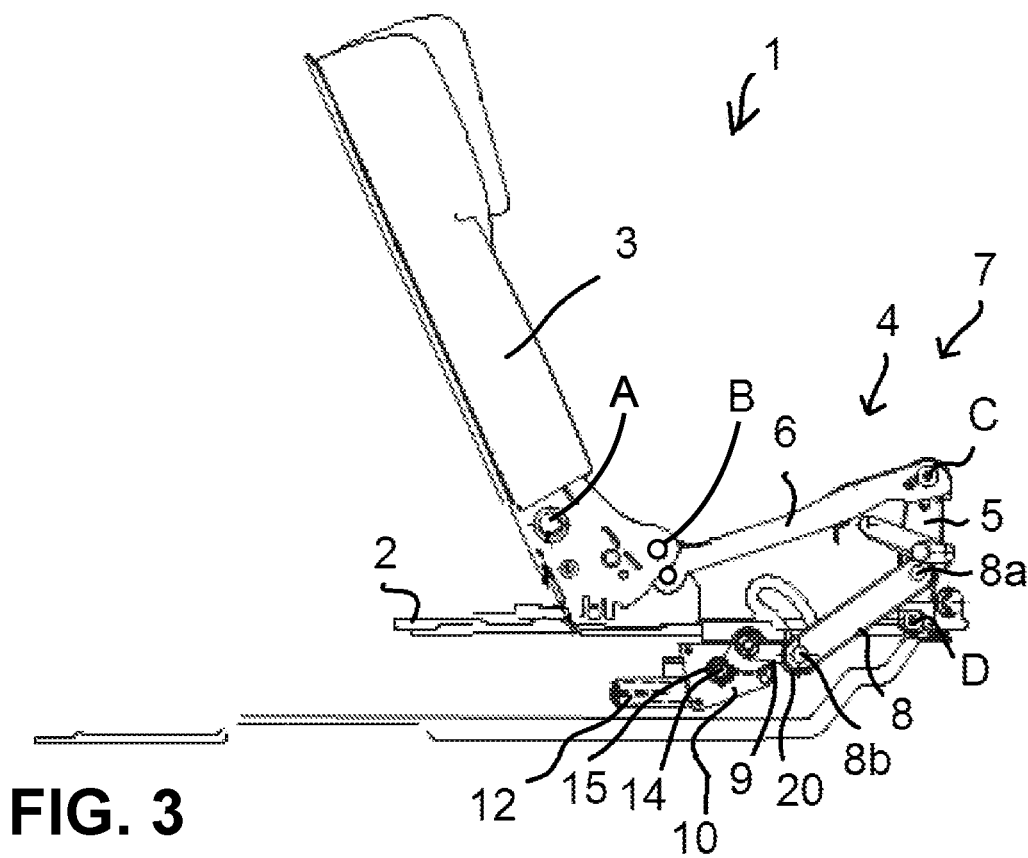
FIG. 3 shows the vehicle seat of FIG. 1 in return position having been set back out of the functional position in motorised manner.

Thus, the seat kinematic 7 can be moved back by the motorised actuation via the motor 12 and the activating system 10, i.e. particularly the rocker 16 together with guiding connecting rod 9, as well as the connecting rod 8, wherein the position of the seat kinematic 7 in the return position of FIG. 3 already corresponds to the normal position of FIG. 1. In this regard, in the return position of FIG. 3, the activating system 10 is however still in its activated return position, as the direct comparison of FIGS. 1 and 3 shows. When moving from FIG. 2 to FIG. 3, thus the complete normal position of FIG. 1 is not yet achieved, such that a repeated manual folding-forward and motorised return would not yet be possible. For this reason, starting from FIG. 3, subsequently a returning of the activating system 10 is effected using a rotation of the motor shaft 14 in a second direction opposed to the first direction, as a result of which thus the rocker 16 is pivoted in a return position opposed to the activating position, i.e. in clockwise direction in the Figures, as is implied in FIG. 4, wherein FIG. 4 already shows the normal position of FIG. 1 again. In this regard, the second, rear end 8b of the connecting rod 8 or the connecting pivot 20 extends between the connecting rods 8 and 9 in the curved elongated hole 17 of the rocker 16 without being adjusted, i.e. the rear end 8b with the connecting pivot 20 travels from the front end of the elongated hole 17 to its rear end during the return from FIG. 3 to FIG. 4, advantageously against a stop-limit in the curved elongated hole 17, i.e. it reaches a limit position or stop position.

Figure 4:
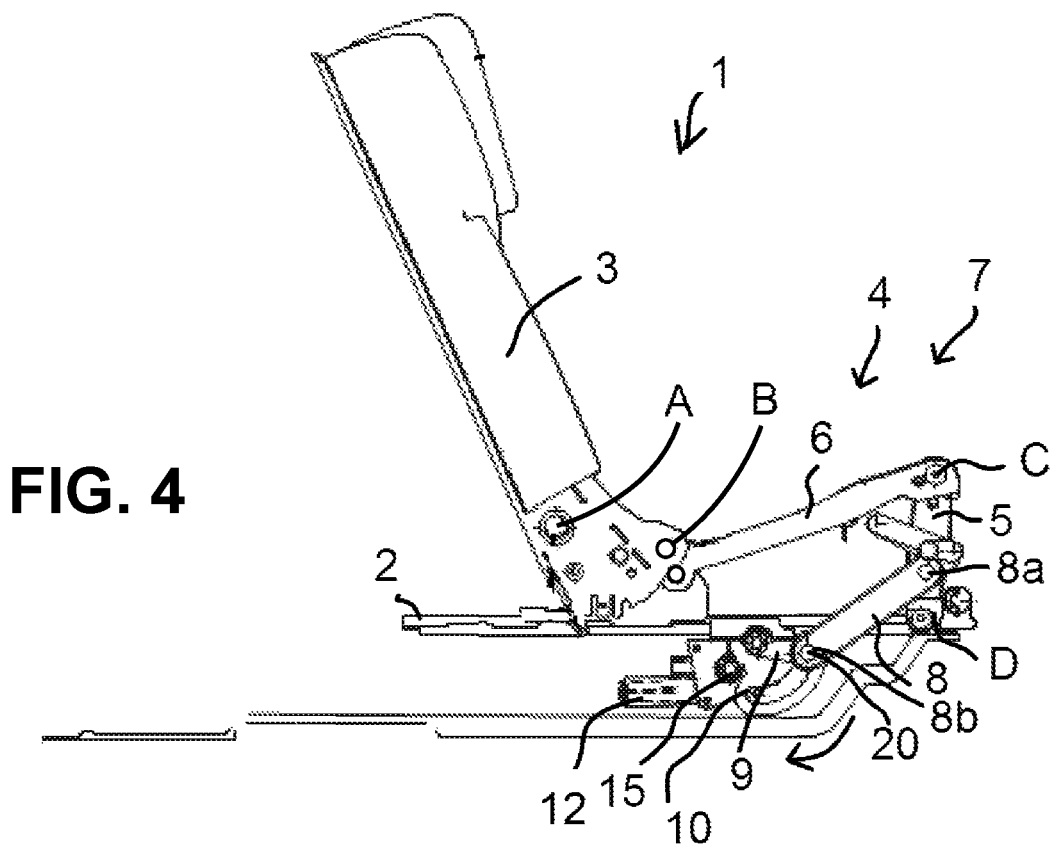
FIG. 4 shows the resetting out of the return position of FIG. 3 into the normal position of FIG. 1.

Thus, the rocker 16 is adjusted back into its normal position of FIG. 4 or FIG. 1, without adjusting the connecting pivot 20 and therewith the connecting rod 8. Thus, starting from the return position of FIG. 3, in turn, the normal position of FIG. 1 is achieved in a purely motorised manner without a manual intervention on the part of the user being necessary for this.

A second embodiment is illustrated at FIGS. 5-15. The second embodiment will not be described in detail below since its structure and operation are similar to those of the first embodiment.

Everything already explained above for the first embodiment is applicable to the second embodiment except when contradicted by the description of the second embodiment. Conversely, everything explained below for the second embodiment is applicable to the first embodiment except when contradicted by the description of the first embodiment.

Figure 5:
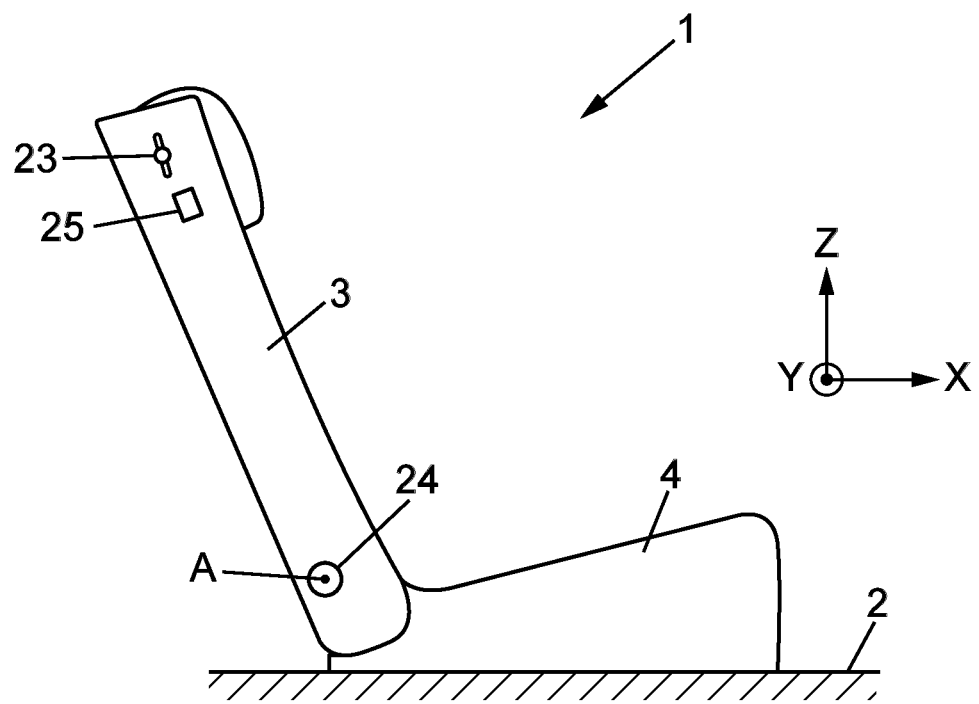
FIG. 5 shows a schematic side view of a vehicle seat according to a second embodiment.

As shown very schematically in FIG. 5, the vehicle seat 1 of the second embodiment is supported on chassis-side structure part 2. Vehicle seat 1 has a backrest part 3 and a seat part 4. In the normal use position, seat part 4 extends forward from the backrest part 3 substantially horizontally around a longitudinal axis X.

Backrest part 3 may be articulated around a backrest axis A which extends parallel to a transversal horizontal axis, perpendicular to longitudinal axis X.

Backrest part 3 may be folded down and forward manually, by actuation of an actuating member 23 (e.g. a handle seat or any other actuating member) which unlatches a mechanical latch 23 which normally holds the backrest part in substantially upright position. The mechanical latch may be for instance an articulation mechanism connecting the backrest part 3 for instance to a base (or to the seat part 4) on which the backrest part is able to pivot. Such articulation mechanisms are well known in the field of automotive seats. Any other latch is possible.

Backrest part 3 may also be unfolded back to the normal position of use either manually, or electrically by actuation of a button 25 or other control member.

Figure 6:
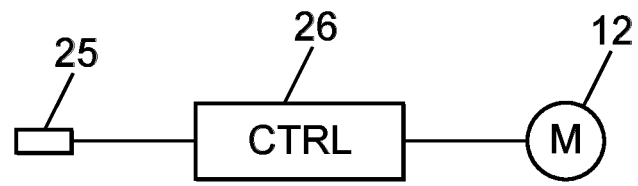
FIG. 6 shows a block diagram of some electrical parts of the vehicle seat of FIG. 5.

As illustrated on FIG. 6, button 25 may be connected to an electronical control unit 26 (CTRL) such as a microcontroller or similar which controls an electric motor 12 (M).

Figure 7:
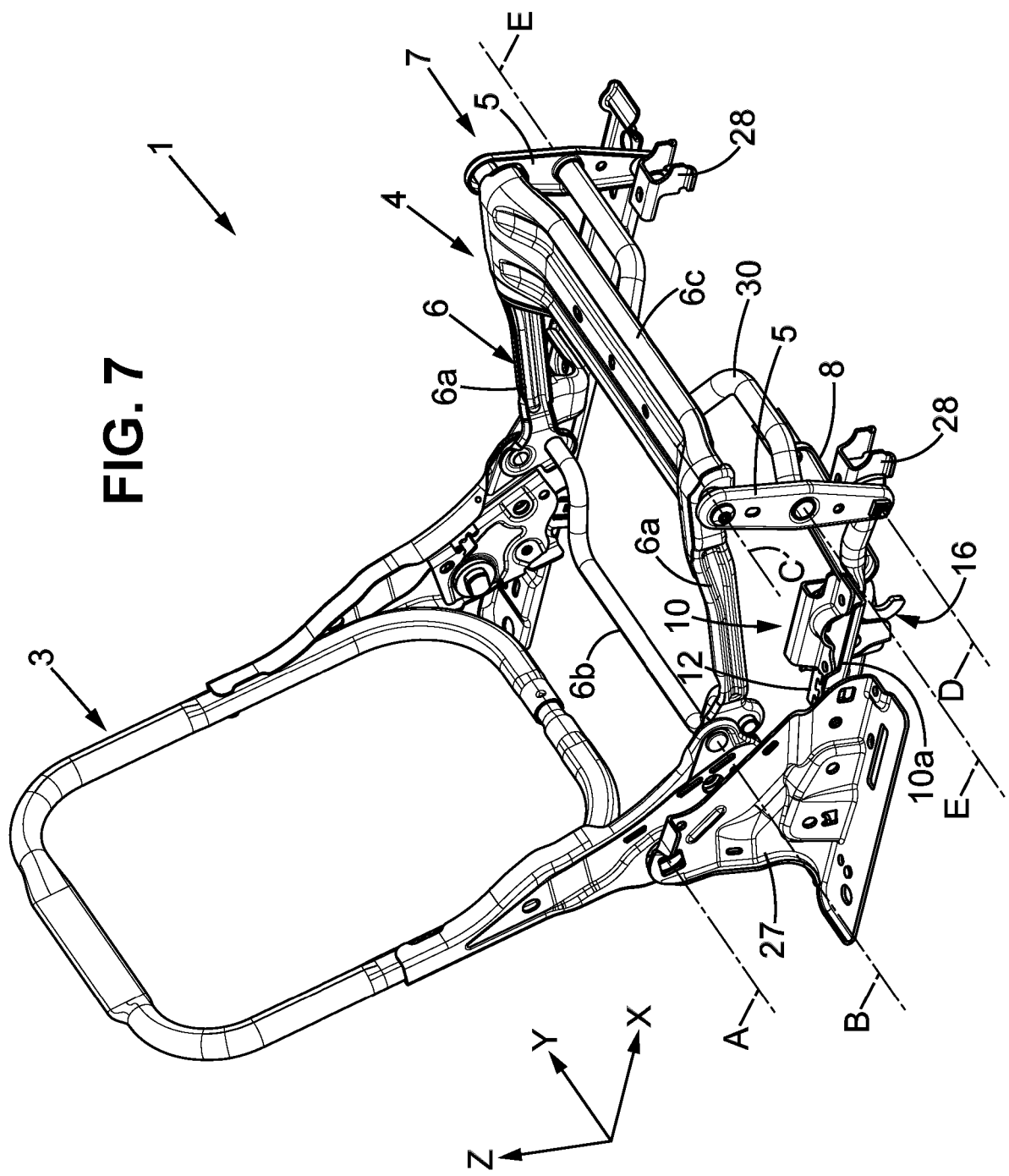
FIG. 7 shows a perspective view of the structure of the vehicle seat of FIG. 5, viewed from a first side of the vehicle seat.

As illustrated on FIG. 7, seat part 4 may have at least one front foot part 5 and a seat structure part 6.

Seat part 4 may include two front foot parts 5 provided on both sides of the seat part 4, for instance two connecting rods.

In the normal position of the seat, front foot parts are substantially upright.

Seat structure 6 may include for instance two lateral side members 6a, a rear cross member 6b joining the two lateral side members 6a and a front cross member 6c joining the two lateral side members 6a.

The rear part of the seat structure 6 may be articulated to backrest part 3, so that seat structure 6 may pivot relative to the backrest part 3 around a rear seat part axis B which is parallel to transverse axis Y. On each side of the backrest part 3, backrest part 3 may be articulated around backrest axis A on a base 27 which is fixed to chassis-side structure part 2. Backrest axis A may be situated higher than rear seat part axis B and rearwards to rear seat part axis B in the normal position of use. More generally, backrest axis A is closer to the top of backrest part 3 than rear seat part axis B.

Backrest part 3 and seat part 4 form together a seat kinematic 7.

Figure 8:
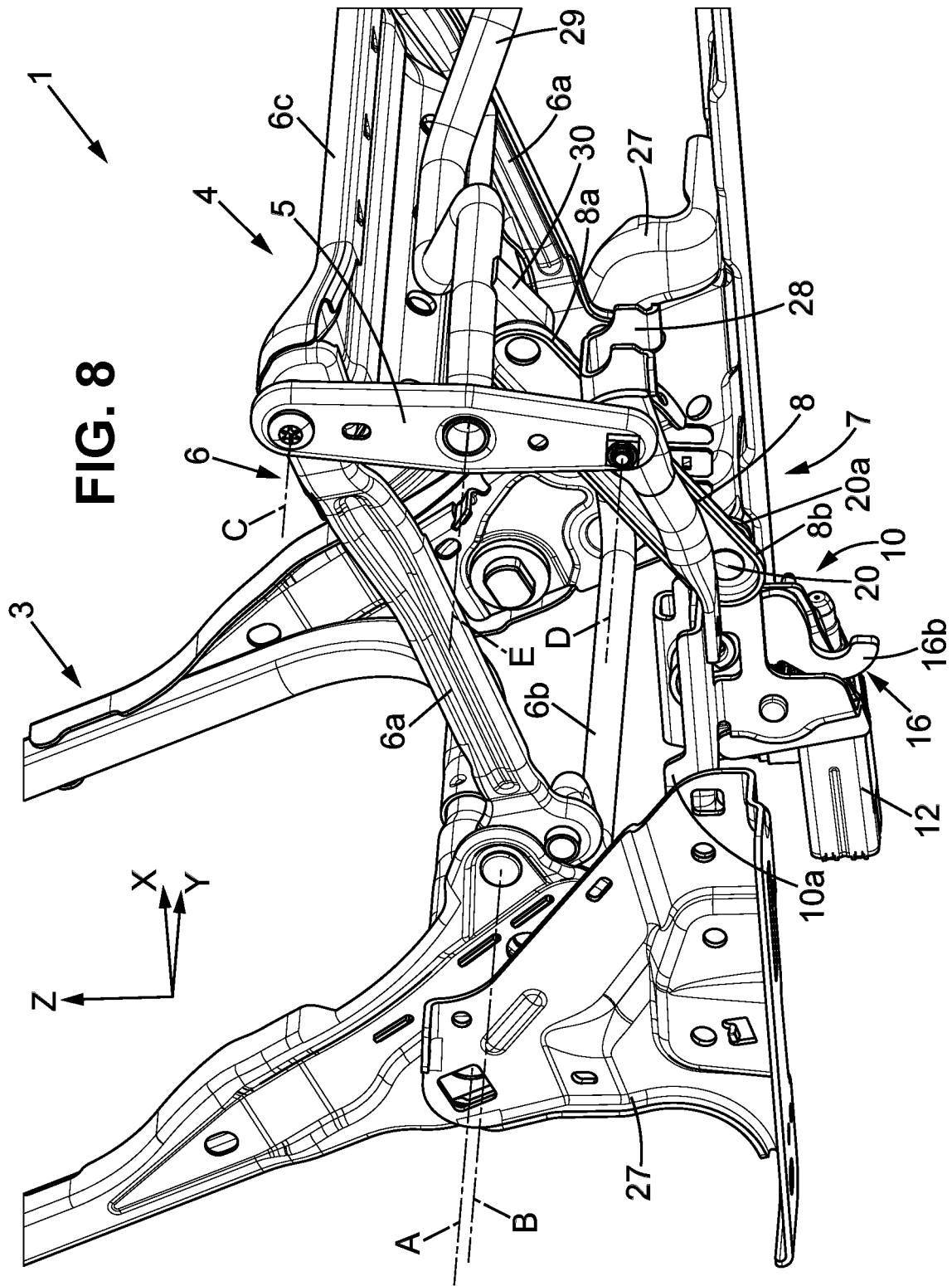
FIG. 8 is a more detailed perspective view of the structure of the vehicle seat of FIG. 5, viewed from the first side of the vehicle seat.

As shown on FIGS. 7 and 8, a connecting rod 8 is articulated on front foot 5 around an axis of rotation E which is parallel to transverse axis Y. Connecting rod 8 extends between first end 8a (front end in the example as shown) and a second end 8b (rear end in the example as shown). In the example as shown in the drawings, first end 8a of connecting rod 8 may be fixed, for instance via a tab 30, to a pivotable crossbar 29 which is pivotally mounted on the two front feet 5 around axis of rotation E. In the normal position of the seat, connecting rod 8 is in a starting position.

Second end 8b of connecting rod 8 may be actuated by an activating system 10 comprising electric motor 12. Activating system 10 includes a support structure 10a which is fixed to chassis-side support structure 2.

Figure 9:
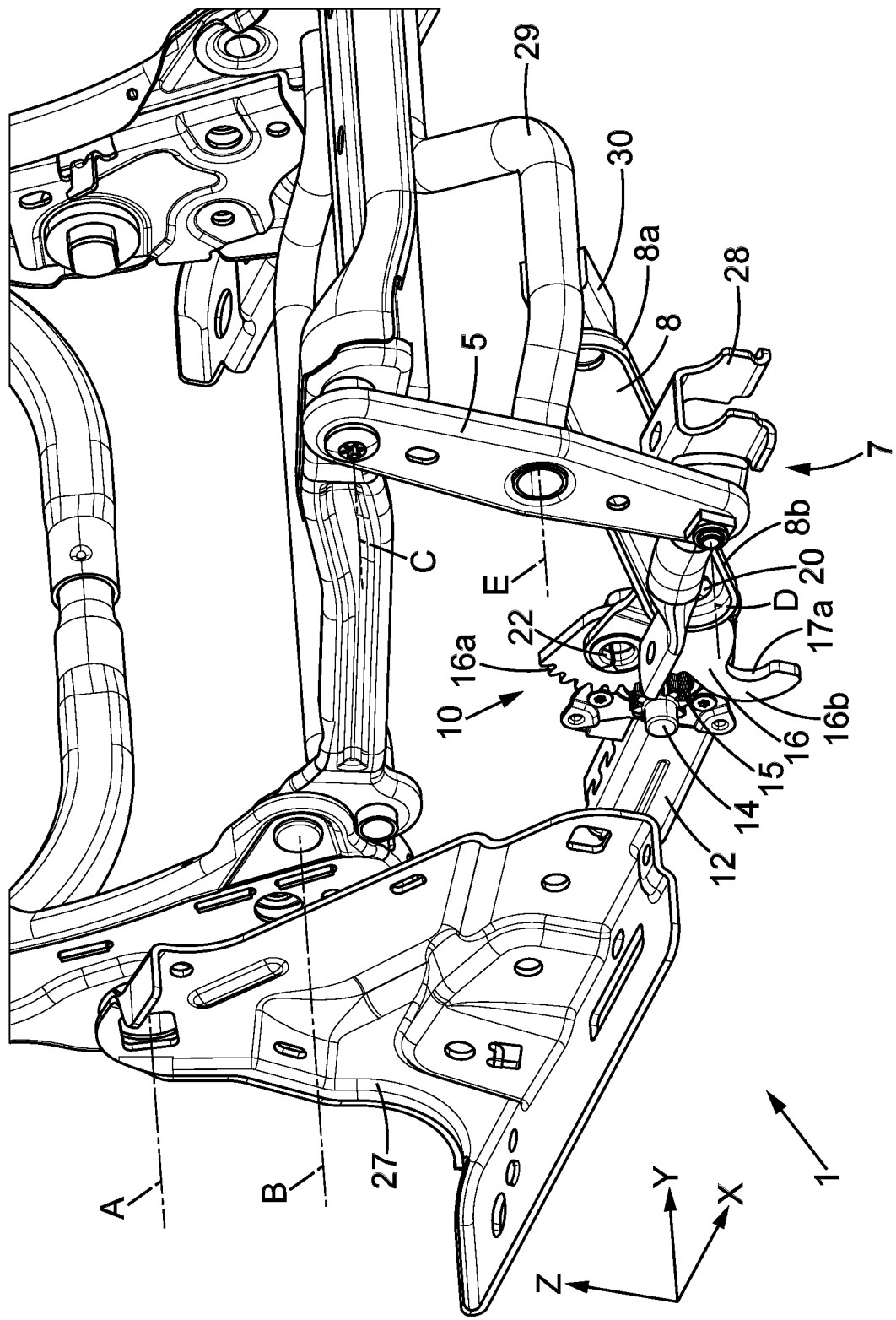
FIG. 9 is a view similar to FIG. 8, without the support structure of the activating system.
Figure 10:
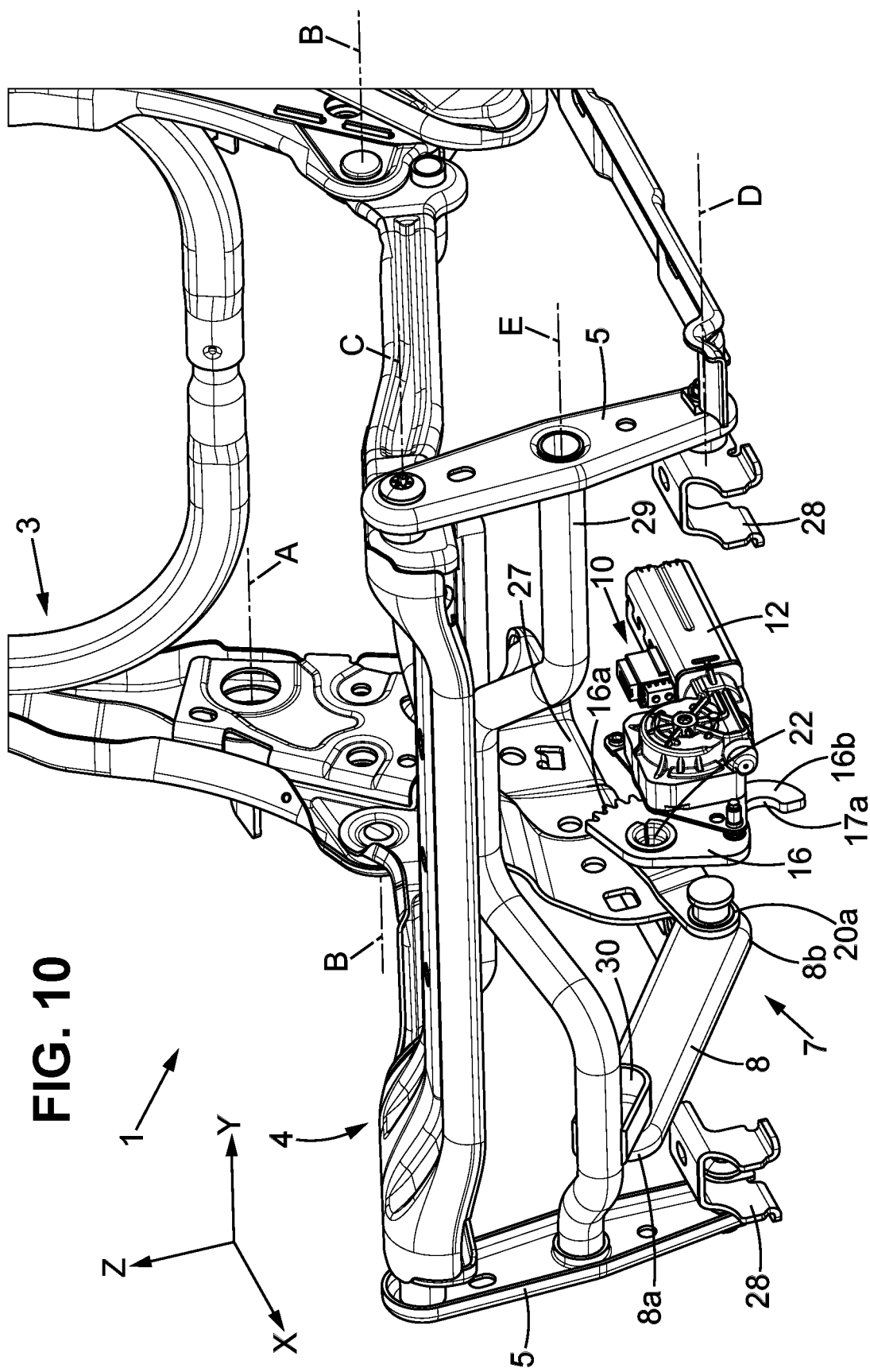
FIG. 10 is a view similar to FIG. 9, viewed from a second side of the vehicle seat.

As illustrated on FIGS. 9-10, second end 8b of connecting rod 8 may be pivotally connected to a guiding connecting rod 9 by a connecting pivot 20, around an axis of rotation parallel to transverse axis Y. Connecting pivot 20 may have a protruding portion 20a which protrudes laterally.

Guiding connecting rod 9 is articulated to support structure 10a by a pivot 22, around an axis of rotation parallel to transverse axis Y.

Activating system may further include a rocker 16 which is pivotally mounted on pivot 20. Rocker 16 may have an external toothing region 16a, forming a circular toothing centred on pivot 22. Rocker may further have a hook 16b defining a recess 17a.

Hook 16b and recess 17a are oriented toward connecting pivot 20, at a distance from connecting pivot 20 while activating system 10 is not actuated. Recess 17a is adapted to receive protruding portion 20a of connecting pivot 20 when activating system 10 is activated, as will be explained below.

External toothing region 16a and hook 16b may be situated on opposite edges of rocker 16.

External toothing region 16a meshes with a drive pinion 15 which is unitary with a motor shaft 14 driven by motor 12 (usually via a reduction gear, not shown).

Activating system is normally in a deactivated position shown in FIGS. 7-10, where rocker 16 does not interfere with protruding portion 20a of connecting pivot 20.

The second embodiment operates as follows.

Figure 11:
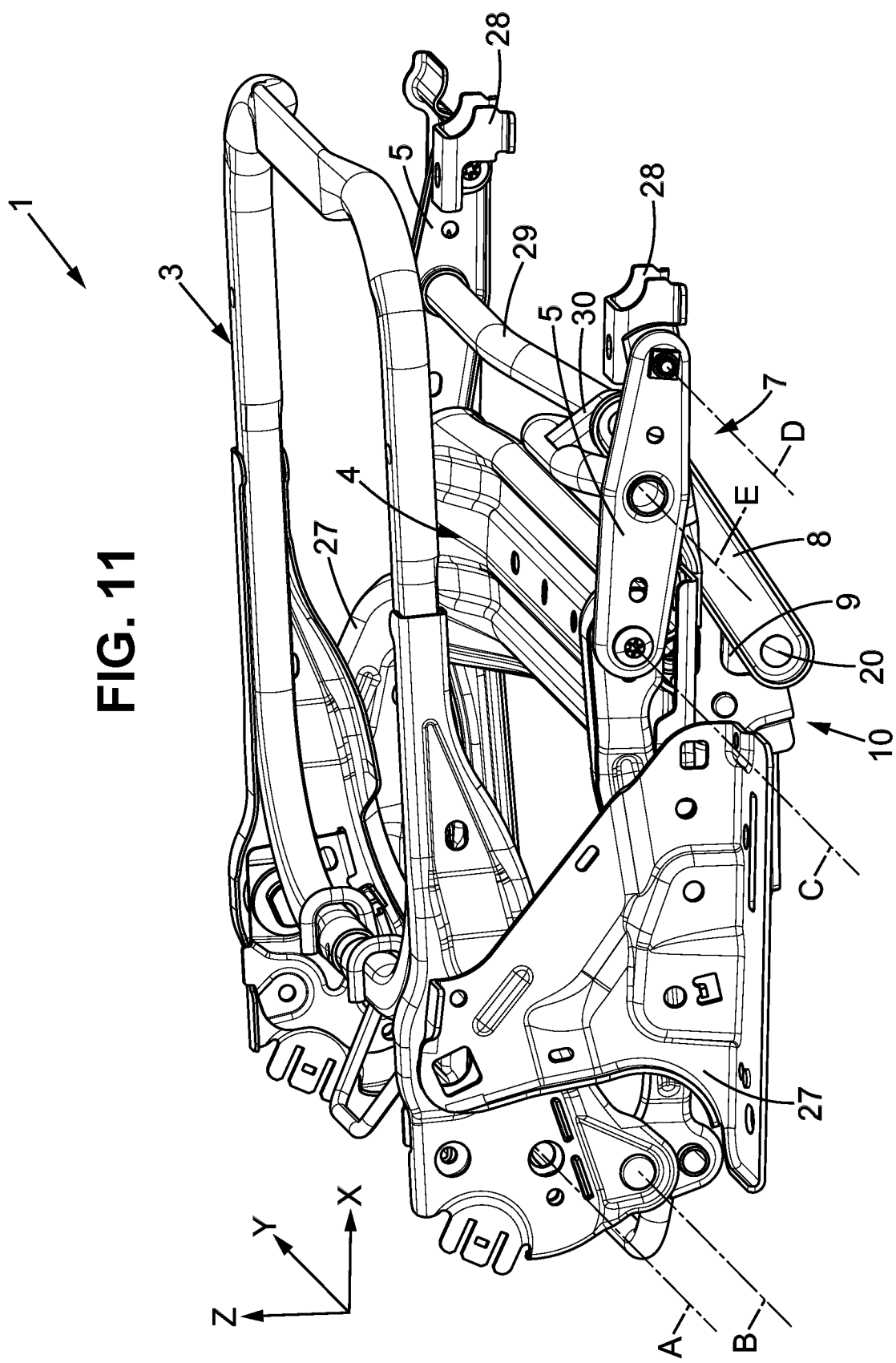
FIG. 11 is a view similar to FIG. 7, in the forward-folded functional position.
Figure 12:
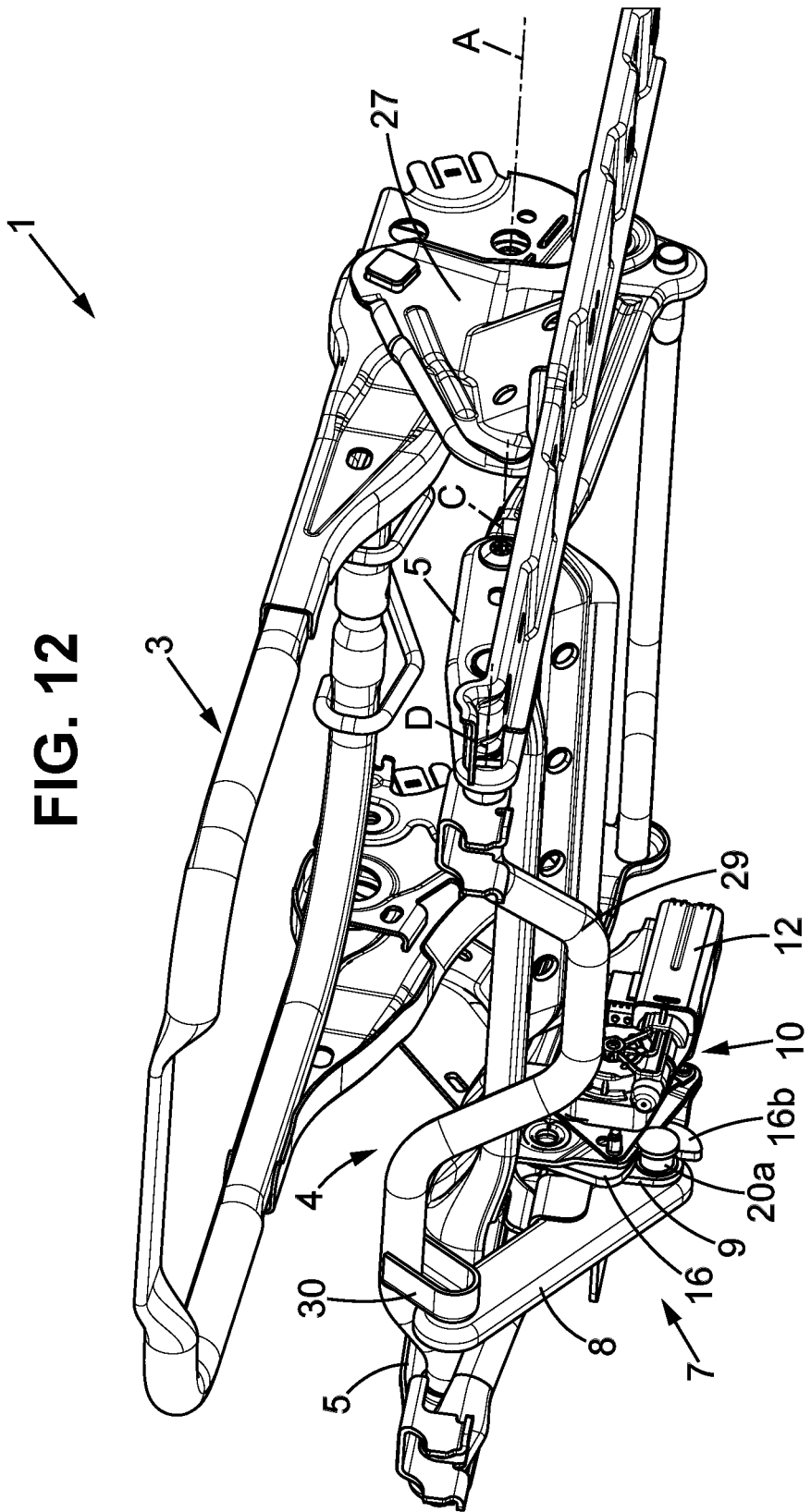
FIG. 12 is a view similar to FIG. 10, in the forward-folded functional position.
Figure 13:
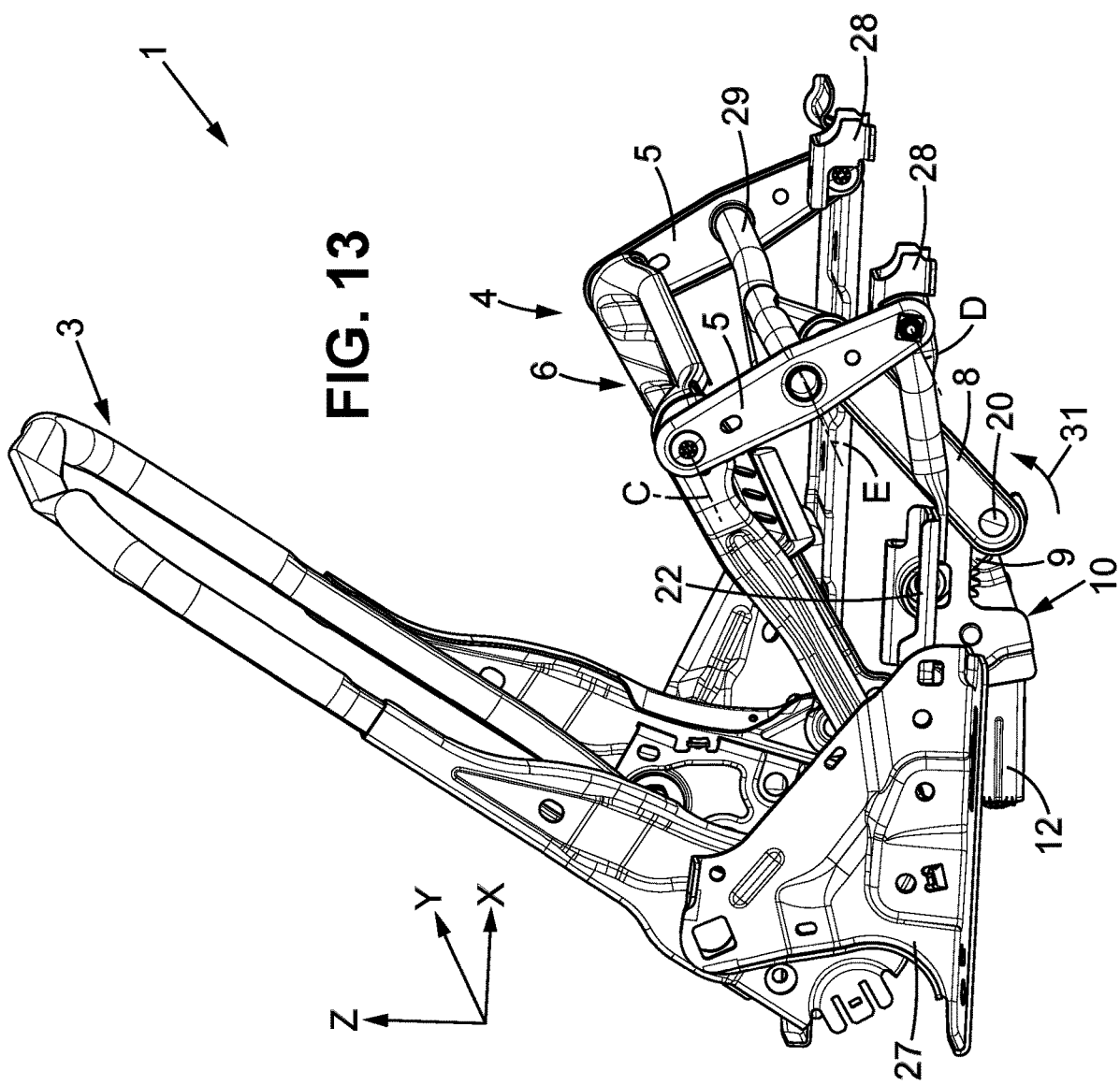
FIG. 13 is a view similar to FIG. 7, in an intermediate position between the forward-folded functional position and the normal position when the seat is being returned to the normal position by the motor.

Starting from the normal position of FIG. 7, after a manual unlocking of the latch (e.g. articulation mechanism 24) of the seat kinematic 7, the vehicle seat 1 can be manually adjusted into the functional position of FIGS. 11-12. In the functional position, the backrest part 3 is manually folded forward, such that its rear side forms a substantially horizontal functional surface (e.g. the rear side of the backrest part 3 may form part of the floor of the car trunk).

During this movement, backrest part 3 pivots forward on backrest axis A, seat part 6 is drawn backward and downward by rear seat part axis B and front feet parts 5 pivot backward and downward around articulation axis D, such that the entire seat part 4 is laid downward into a flat position under the folded-forward backrest part 3.

During this manual collapsing or manual folding from FIG. 7 to FIG. 11, connecting rod 8 is also moved via pivoting foot part 5, backwards and downwards and protruding portion 20a of connecting pivot 20 is received in recess 17a of rocker 16. Activating system 10 remains in the deactivated position.

Subsequently, unfolding back from FIG. 11 into FIG. 7 is also possible, and the kinematic 7 is latched by articulation mechanism 24 or other latch when it returns to the normal position.

As explained for the first embodiment, the user has the choice between manual return and motorized return to normal position.

Figure 14:
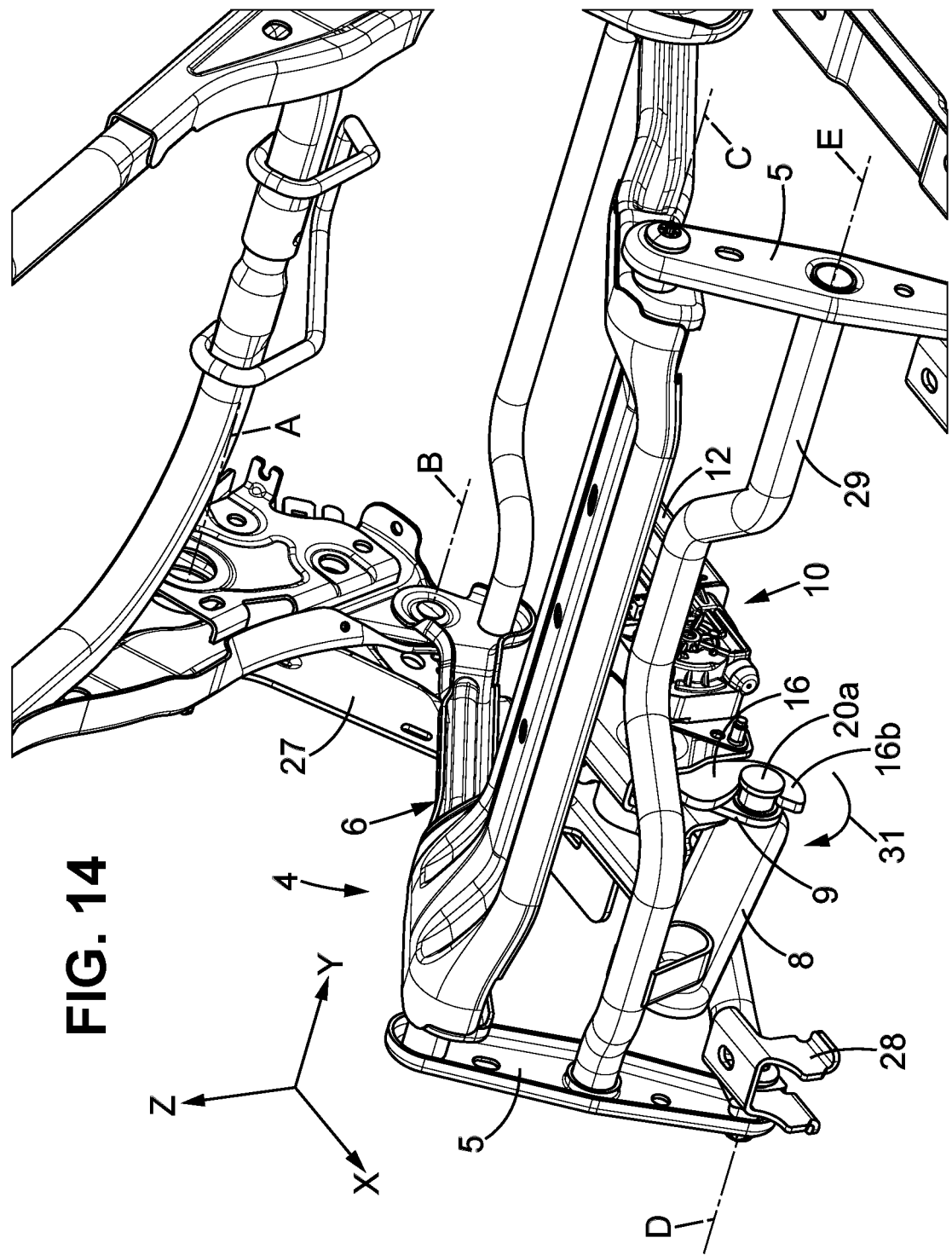
FIG. 14 is a view similar to FIG. 10, in the intermediate position of FIG. 13.
Figure 15:
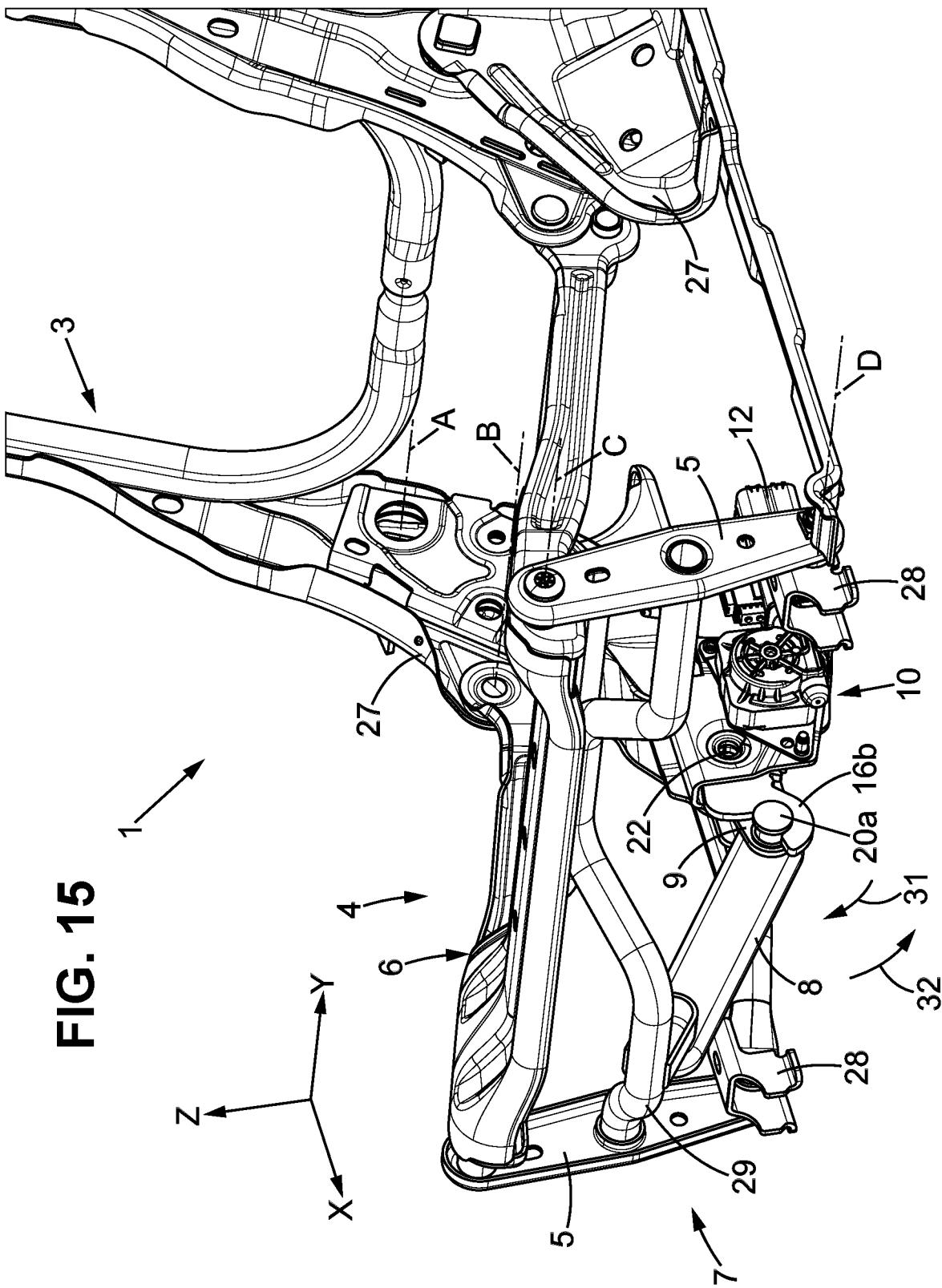
FIG. 15 is a view similar to FIG. 10, showing the seat after it has been returned to the normal position by the motor and before the activating system has been returned to its initial position by the motor.

To use motorized return, the user actuates button 25 or other user interface, so that control unit 26 then controls motor 12 as follows:

a) in a first step, control unit 26 has motor 12 turn motor shaft 14 in a first direction wherein the drive pinion 15 turns the rocker 16 in an activating direction 31 (see FIGS. 13-14) until it reaches an activated position (FIG. 14). The rocker 16 thus entrains protruding portion 20a of pivot 20 received in recess 17a and thereby the rear, second end 8b of connecting rod 8, and adjusts the rear, second end 8b forward and upward. Since connecting rod 8 is articulated with its front end 8a at the front foot part 5 between its axes C and D, the front foot part 5 is pivoted back forward and upward, i.e. back into its upright position, as a result of which the entire seat kinematic 7 is returned into the normal position (FIG. 15). The seat kinematic 7 is then automatically latched again by the latch (articulation mechanism 24 or other latch), as it is well-known in the art.

b) In a second step, control unit 26 has motor 12 turn motor shaft 14 in a second direction opposed to the first direction, as a result of which thus the rocker 16 is pivoted in a deactivating direction 32 (FIG. 15) opposed to activating direction 31, into the initial deactivated position as shown in FIGS. 7-11. The seat is then entirely in the normal position of use.

Vehicle seats generally facilitate functional adjustments between their upright normal position and one or several functional positions, in particular a folded-forward functional position. In the normal position, the backrest or its backrest part is substantially upright and a seat part in an upper normal position, such that a seat occupant can sit on the seat part and lean on the backrest. Generally, a detent mechanism or latch is released for adjusting, such that the backrest part can be folded forward and e.g. forms with its rear side a substantially horizontal functional surface. In this regard, generally, the seat part is also adjusted in a combined adjustment movement, such that the backrest part and the seat part form an adjustable seat kinematic.

In addition to manual adjustments, also motorised adjustments may be used. Generally with an electric motor, such that the user needs only to start the adjustment procedure. A frequent disadvantage of motorised adjustments is that they take place relatively slowly, since the motor and an adjustment gear mechanism connected downstream thereof need to be sized appropriately in order to facilitate a safe adjustment, and thereby the costs and weight are increased. The motor and the adjustment gear mechanism or an activating system driven by the motor generally also engage on lower regions of the seat kinematic, such that they are generally obliged to carry out the adjustment with inconvenient lever forces. Furthermore, rapid motorised adjustments are fundamentally also not without risk, as they can in some cases result in further objects getting jammed or a danger to the user. Manual adjustments are frequently faster and able to be carried out without activating a power supply; however, particularly the return adjustment out of the functional position into the normal position is frequently connected with significant outlay of force.

In this regard, the installation of a motor with an adjustment gear mechanism generally prevents a manual folding, since for this purpose e.g. a coupling or operative connection between the seat kinematic and the electric motor or the adjustment gear mechanism needs to be released.

Thus, generally, either a manual or motorised adjustment of the vehicle seat in both directions is provided. Comparative solutions in this regard are generally associated with high levels of hardware expenditure and are thus accordingly expensive and complicated, and increase also the weight accordingly.

One purpose of the present disclosure is the creation of a vehicle seat which can be adjusted with low effort between an upright normal position and a functional position and facilitates for the user a high degree of comfort in adjustment.

This purpose is solved by a vehicle seat including:

a foldable seat kinematic which has a backrest part and a seat part, said seat kinematic being adjustable between a normal position and a folded-forward functional position, said seat kinematic being manually foldable from the normal position into the folded-forward functional position;

a motor;

an activating system which is adapted to be driven by the motor between a deactivated position and an activated position;

a connecting rod provided between the activating system and the seat kinematic;

wherein the seat kinematic is movable from the folded-forward functional position into the normal position by the activating system and the connecting rod when the motor is actuated so as to drive the activating system from the deactivated position to the activated position, said activating system being configured to not interfere with the seat kinematic when said activating system is in the deactivated position.

Thus, a foldable seat kinematic is provided which can be manually adjusted by the user. In this regard, in particular a manual adjustment from the upright normal position into the folded functional position is provided; advantageously, also a manual return adjustment is basically possible. Furthermore, a motorised adjustment of the seat from the folded functional position back into the upright normal position is provided, for which an electric motor drives an activating system which adjusts the seat kinematic by way of a connecting rod.

Several advantages are already attained hereby. Thus, the user is able to fold the vehicle seat manually from the normal position into the functional position, which is generally possible more rapidly than with electric adjustments, advantageously also in the case of a switched-off electrical supply. By means of the electrical return adjustment from the folded functional position into the normal position, a higher degree of comfort is offered to the user, since this adjustment generally requires a higher degree of strength and it is less easy to reach e.g. engagement points for this manual return adjustment.

In this regard, advantageously no additional adjustment on the part of the user is provided in order to achieve the electrical return adjustment into the normal position from the functional position; thus, the user is able subsequently in turn to fold vehicle seat manually into the functional position.

When manually folding the seat into the functional position, the connecting rod can be adjusted with respect to the activating system without the activating system being compromised thereby. Advantageously, the connecting rod has a first or front end which is mounted on the seat kinematic and a second or rear end which is connected with the activating system. The rear end is particularly accommodated within limit stops and/or by way of an entrainment system in the activating system, e.g. in an elongated hole of a rocker of the activating system.

During the manual folding of the vehicle seat into the functional position, thus the second end of the connecting rod is adjusted with respect to the activating system, e.g. in the curved elongated hole of a rocker of the activating system. The curved elongated hole can define e.g. a stop limit or a stop position. During the motorised return adjustment, the motor drives the activating system, e.g. the rocker of the activating system, which adjusts back the connecting rod by way of the reception of the rear end of the connecting rod in the elongated hole, as a result of which the seat kinematic is righted and again assumes its normal position.

By means of this motorised adjustment, a return position is achieved in which the seat kinematic is admittedly already adjusted back into the normal position, but the activating system is not yet in its normal position. In order to achieve this, advantageously a subsequent adjustment of the activating system is undertaken by turning the motor in the opposite direction, as a result of which the activating system is adjusted into the normal position without in this regard adjusting the seat kinematic. In this regard, in particular the rocker can be pivoted in the opposite direction, such that the rear end of the connecting rod is guided in the curved elongated hole of the rocker and comes to rest against a limit stop.

At the end of this return adjustment, thus the activating system is again in its normal position or starting position, wherein in particular the second or rear end of the connecting rod can again reach the front limit stop or a front end of the elongated hole of the activating system.

Thus, a secure adjustment can be achieved with a low level of hardware expenditure and few components, and in particular also an easy control of the motor.

In this regard, an electric motor or also an E-pump can be provided in order to guarantee the adjustment of the activating system.

Advantageously, the seat kinematic has a foldable backrest part which in the functional position can form in particular a substantially horizontal rear side, and a seat part, wherein the seat part has in particular a seat structure part and a front foot part connected in an articulated manner with this, which front foot part is articulated on its lower end on a floor structure of the chassis. The kinematic of the seat part can particularly be configured such that when the backrest part is folded forward into the functional position the rear end of the seat structure part is pivoted downward and to the rear, and as a result the front foot part pivots at its upper end to the rear and downward, such that the seat part is folded flatly to the rear and as a result, advantageously, the connecting rod is pivoted via the front foot part to the rear.

In various embodiments, one ca use on or several of the following features, alone or in all possible mutual combinations:

the connecting rod has a first end and second end, said first end is connected with the seat kinematic and said second end is actuatable by the activating system;

said first end of the connecting rod is articulated on the seat kinematic;

the second end of the connecting rod is movable via manual folding of the seat kinematic between a first position corresponding to the normal position of the seat kinematic and a second position corresponding to the folded-forward functional position of the seat kinematic, and the second end of the connecting rod is movable by the activating system from the second position to the first position, by turning the motor in a first direction.

The motor is controlled by a control unit which, for moving the seat kinematic from the folded-forward functional position into the normal position, is adapted to:

in a first phase, have the motor turn in the first direction until the activating system is in the activated position and the seat kinematic is in the normal position; and in a second phase, have the motor turn in a second direction opposed to the first direction until the activating system is returned into the deactivated position.

the activating system has a rocker which is adapted to be pivoted bidirectionally by the motor, said rocker) being configured to move the connecting rod;

said rocker defines a first limit stop and second limit stop for the connecting rod, wherein the connecting rod is movable between the first limit stop and the second limit stop relative to the rocker;

the rocker has an elongated hole in which a portion unitary with the second end of the connecting rod is accommodated;

said rocker is configured to abut on a portion unitary with the second end of the connecting rod to move the connecting rod from the second position to the first position when the activating system is moved from the deactivated position to the activated position.

The vehicle seat further comprises a drive pinion which is adapted to be rotated by the motor and which is in engagement with a toothing region of the rocker;

a guiding connecting rod is articulated on a connecting pivot at the second end of the connecting rod;

the seat kinematic is foldable back manually into the normal position, without use of the activating system;

the seat kinematic is maintained in the normal position by a latch which is actuatable to release the seat kinematic and which is adapted to automatically latch the seat kinematic when said seat kinematic is returned from the folded-forward functional position to the normal position.

The invention claimed is:

1. A vehicle seat including:
   a foldable seat kinematic which has a backrest part and a seat part, said seat kinematic being adjustable between a normal position and a folded-forward functional position, said seat kinematic being manually foldable from the normal position into the folded-forward functional position;
   a motor;
   an activating system which is adapted to be driven by the motor between a deactivated position and an activated position;
   a connecting rod provided between the activating system and the seat kinematic;
   wherein the seat kinematic is movable from the folded-forward functional position into the normal position by the activating system and the connecting rod when the motor is actuated so as to drive the activating system from the deactivated position to the activated position, said activating system being configured to not interfere with the seat kinematic when said activating system is in the deactivated position,
   wherein the connecting rod has a first end and second end, said first end is connected with the seat kinematic and said second end is actuatable by the activating system,
   wherein said first end of the connecting rod is articulated on the seat kinematic, and
   wherein the second end of the connecting rod is movable via manual folding of the seat kinematic between a first position corresponding to the normal position of the seat kinematic and a second position corresponding to the folded-forward functional position of the seat kinematic, and wherein the second end of the connecting rod is movable by the activating system from the second position to the first position, by turning the motor in a first direction.

2. The vehicle seat of claim 1, wherein the motor is controlled by a control unit which, for moving the seat kinematic from the folded-forward functional position into the normal position, is adapted to:
   in a first phase, have the motor turn in the first direction until the activating system is in the activated position and the seat kinematic is in the normal position; and
   in a second phase, have the motor turn in a second direction opposed to the first direction until the activating system is returned into the deactivated position.

3. The vehicle seat of claim 1, wherein the activating system has a rocker which is adapted to be pivoted bidirectionally by the motor, said rocker being configured to move the connecting rod.

4. The vehicle seat of claim 3, wherein said rocker defines a first limit stop and second limit stop for the connecting rod, wherein the connecting rod is movable between the first limit stop and the second limit stop relative to the rocker.

5. The vehicle seat of claim 4, wherein the rocker has an elongated hole in which a portion unitary with the second end of the connecting rod is accommodated.

6. The vehicle seat of claim 3, wherein said rocker is configured to abut on a portion unitary with the second end of the connecting rod to move the connecting rod from the second position to the first position when the activating system is moved from the deactivated position to the activated position.

7. The vehicle seat of claim 3, further comprising a drive pinion which is adapted to be rotated by the motor and which is in engagement with a toothing region of the rocker.

8. The vehicle seat of claim 1, wherein a guiding connecting rod is articulated on a connecting pivot at the second end of the connecting rod.

9. A vehicle seat including:
   a foldable seat kinematic which has a backrest part and a seat part, said seat kinematic being adjustable between a normal position and a folded-forward functional position, said seat kinematic being manually foldable from the normal position into the folded-forward functional position;
   a motor;
   an activating system which is adapted to be driven by the motor between a deactivated position and an activated position;

a connecting rod provided between the activating system and the seat kinematic;

wherein the seat kinematic is movable from the folded-forward functional position into the normal position by the activating system and the connecting rod when the motor is actuated so as to drive the activating system from the deactivated position to the activated position, said activating system being configured to not interfere with the seat kinematic when said activating system is in the deactivated position, and wherein the seat kinematic is foldable back manually into the normal position, without use of the activating system.

10. A vehicle seat including:

a foldable seat kinematic which has a backrest part and a seat part, said seat kinematic being adjustable between a normal position and a folded-forward functional position, said seat kinematic being manually foldable from the normal position into the folded-forward functional position;

a motor;

an activating system which is adapted to be driven by the motor between a deactivated position and an activated position;

a connecting rod provided between the activating system and the seat kinematic;

wherein the seat kinematic is movable from the folded-forward functional position into the normal position by the activating system and the connecting rod when the motor is actuated so as to drive the activating system from the deactivated position to the activated position, said activating system being configured to not interfere with the seat kinematic when said activating system is in the deactivated position, and wherein the seat kinematic is maintained in the normal position by a latch which is actuatable to release the seat kinematic and which is adapted to automatically latch the seat kinematic when said seat kinematic is returned from the folded-forward functional position to the normal position.

11. A vehicle seat including:

a foldable seat kinematic which has a backrest part and a seat part, said seat kinematic being adjustable between a normal position and a folded-forward functional position, said seat kinematic being manually foldable from the normal position into the folded-forward functional position;

a motor;

an activating system which is adapted to be driven by the motor between a deactivated position and an activated position;

a connecting rod provided between the activating system and the seat kinematic;

wherein the seat kinematic is movable from the folded-forward functional position into the normal position by the activating system and the connecting rod when the motor is actuated so as to drive the activating system from the deactivated position to the activated position, said activating system being configured to not interfere with the seat kinematic when said activating system is in the deactivated position, and wherein the activation system is movable relative to the seat kinematic from the activated position to the deactivated position.

12. A vehicle seat including:

a foldable seat kinematic which has a backrest part and a seat part, said seat kinematic being adjustable between a normal position and a folded-forward functional position, said seat kinematic being manually foldable from the normal position into the folded-forward functional position;

a motor;

an activating system which is adapted to be driven by the motor between a deactivated position and an activated position;

a connecting rod provided between the activating system and the seat kinematic;

wherein the seat kinematic is movable from the folded-forward functional position into the normal position by the activating system and the connecting rod when the motor is actuated so as to drive the activating system from the deactivated position to the activated position, said activating system being configured to not interfere with the seat kinematic when said activating system is in the deactivated position, and wherein the seat part moves relative to the activation system from the normal position to folded-forward functional position without movement of the activation system.

13. A vehicle seat including:

a foldable seat kinematic which has a backrest part and a seat part, said seat kinematic being adjustable between a normal position and a folded-forward functional position, said seat kinematic being manually foldable from the normal position into the folded-forward functional position;

a motor;

an activating system which is adapted to be driven by the motor between a deactivated position and an activated position;

a connecting rod provided between the activating system and the seat kinematic;

wherein the seat kinematic is movable from the folded-forward functional position into the normal position by the activating system and the connecting rod when the motor is actuated so as to drive the activating system from the deactivated position to the activated position, said activating system being configured to not interfere with the seat kinematic when said activating system is in the deactivated position, and wherein the activation system is movable relative to the seat kinematic from the activated position to the deactivated position when the seat kinematic is in the normal position after the activation system moves the seat kinematic from the folded-forward functional position to the normal position.

\* \* \* \* \*